Aug. 1, 1961     J. GRAHLING     2,994,300
SAFETY LEADER
Filed July 14, 1958
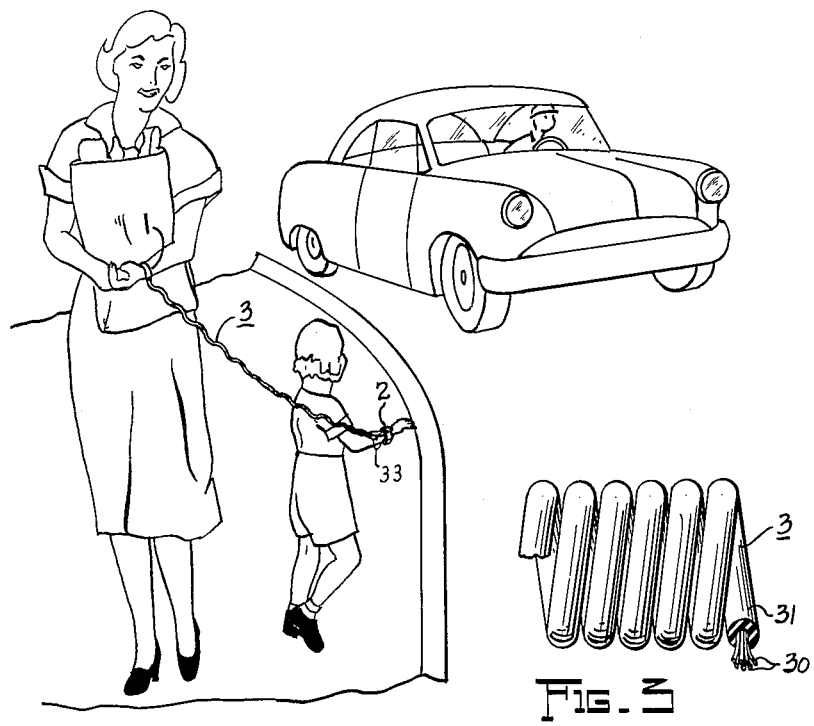
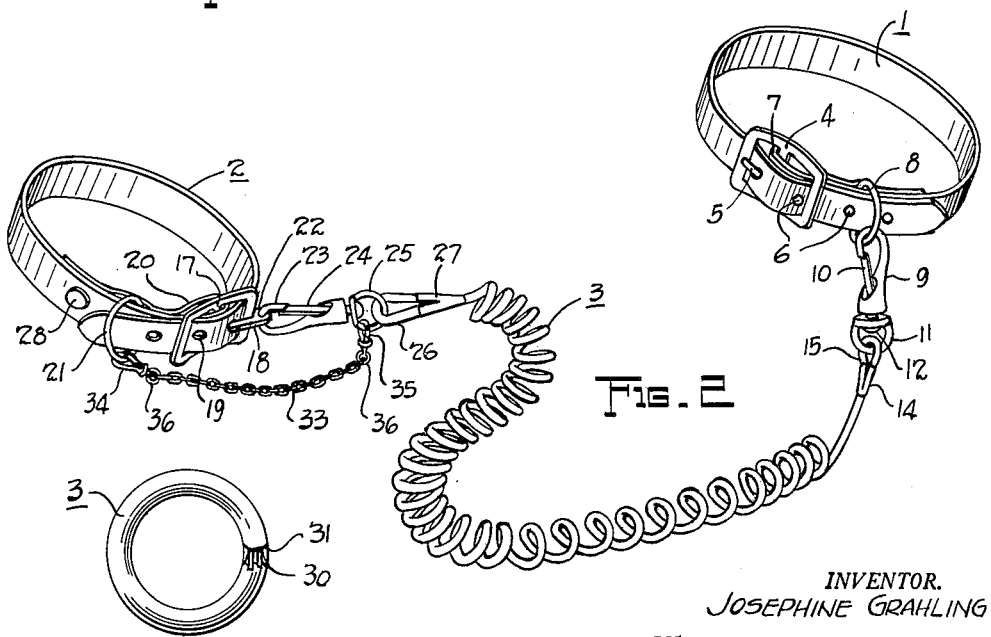
INVENTOR.
JOSEPHINE GRAHLING
BY Bosworth, Sessions
Herrstrom and Knowles
ATTORNEYS

United States Patent Office 2,994,300
Patented Aug. 1, 1961

2,994,300
SAFETY LEADER
Josephine Grahling, 3562 Som Center Road,
Cleveland 24, Ohio
Filed July 14, 1958, Ser. No. 748,266
9 Claims. (Cl. 119—96)

This invention relates to safety devices or leashes by means of which adults are able to maintain control over children as while walking or shopping. Various types of restraining devices have been devised for controlling and limiting the travel of children in relation to supervising adults. Essentially such devices comprise a cord, strap or chain one end of which is connected to the child as by a band or harness and the other end of which is held by or fastened to the person of the adult.

In accordance with one aspect of the present invention and as a principal objective the connecting or leash element is provided in the form of a resilient helical coil member which is substantially straightened in tension under normal use to a length at least about four times its unstressed length. When relieved of stress the leash element is capable of returning by inherent resiliency to its former helical coil form and length. Such a leash element comprises a substantially inextensible resilient flexible member of uniform section which, by reason of the helical coil form to which it is shaped in manufacture, is readily stretched to its elongated or straightened form, thereby allowing maximum freedom of easy movement for both the child and the adult.

In accordance with another aspect of the invention and as another objective the leash element is connected to the child in such a way as to discourage disconnection by the child. More specifically it is sought to provide a wrist or other band for attachment about the person of the child, the band having a locking type buckle with an eye in its tongue to which the leash is attached by a snap hook.

Supplementing the snap hook connection and as a further objective, there is provided, in combination with the snap hook arrangement, a relatively short flexible element or chain connected between the leash element and a ring fast to the band, the connection to the leash being at a point of the latter beyond the snap hook. Such supplemental connecting chain, in combination with the snap hook arrangement of the principal leash element, provides for alternative close coupled restraining connections with complete security during changeover and also maintains the connection between the leash and the band on the child even though the main snap hook should become disconnected.

A further object is to provide a control device of the character mentioned which can be quickly converted between a long leash connection and a close coupled connection.

A still further object is to provide a safety leash for children which allows a relatively wide latitude of movement of the child away from the adult without danger of the leash becoming tangled or tripping the adult or the child when the two persons are close together.

Other objects and advantages will become apparent in the following detailed description of a preferred embodiment representing the best known mode of practicing the invention. This description is made in connection with the accompanying drawings forming a part of the specification.

In the drawings:

FIG. 1 illustrates the use of the present safety leash by a woman who is shopping and has her arms burdened with a bundle in controlling a small child while walking along a sidewalk adjacent a road travelled by automobiles;

FIG. 2 is an illustration of the safety leash device showing the bands adapted to be placed about the persons of the adult and the child, the flexible elastic leash element which connects the bands, the close coupling chain and the several snap hook connectors;

FIG. 3 is a fragmentary elevational view, partly in section, showing a portion of the resilient helical coil leash element in its molded or unstressed condition, this view being enlarged with respect to the preceding figures; and FIG. 4 is an end view of the portion of the leash element shown in FIG. 3.

The device comprises a pair of flexible and substantially inextensible bands 1, 2 connected by a flexible and elastic leash element 3. The first band 1 is designed for attachment to the adult, as by encirclement of the wrist, and the second band 2 is designed for attachment to the child, also as by encirclement of the wrist. These bands are formed of flat strip leather or plastic material. A conventional buckle 4 is provided to join the ends of the adult's band 1, the buckle having a cross bar received in a reverse bend 7 formed at one end of the band and having a tongue 5 receivable in any one of a number of holes 6 formed at spaced intervals in the band to permit adjustment of the band size. The reversely bent end of the band also receives and retains a ring 8 for attachment of one end of the leash element 3 as by a snap hook 9. This snap hook has a spring lock or keeper 10 which prevents inadvertent disconnection of the hook from the ring 8. A swivel ring 11 is connected to the body of the hook 9 in rotatable relation as by a headed pin 12 received through a radial hole in one side of the ring so that the leash may turn relative to the hook and the band. The end of the leash element is passed through the ring 11, bent back upon itself and secured as by a compression fitting 14 in the provision of an end loop or eye 15.

The child's band 2 is similar to the adult's band 1, its size being adjustable by means of a conventional buckle 17 having a tongue 18 receivable through any one of a number of holes 19 formed at spaced intervals in the other end portion of the band. Loop 20 in the end of the band for securing the buckle 17 and corresponding to the end bend or loop 7 in the wrist band 1 for the adult also receives and secures a metal ring 21 which constitutes a supplemental point of connection between the leash element 3 and the child's band, as will appear.

The primary point of connection to the child's band is the tongue 18 of the buckle 17, the tongue being formed with an eye 22 in its end through which is received a snap hook 23 on the other end of the leash element 3. Such snap hook is similar, in fact may be identical, to the snap hook 9 connected to the ring 8 of the adult's band. Thus the snap hook 23 has a spring lock or keeper 24, a swivel ring 25, and a connecting swivel pin. The leash element 3 is connected to the swivel ring 25 as by a loop or eye 26 held by fitting 27 similar to the loop 15 and fitting 14 on the opposite end.

The least element 3 comprises a substantially inextensible resilient flexible member which is of uniform section and which, in its unstressed condition, is in the form of a helical coil with closely spaced convolutions. The convolutions of the leash coil are of uniform diameter, as shown in FIGS. 3 and 4, such diameter being at least 3 but preferably between about 5 and about 7 times the transverse dimension of the flexible member comprising the leash element.

The inextensible member of which the leash element is formed is made by conventional procedures well known in the rubber working art. For example, a plurality of tensile strands 30 which may be metallic wires or vegetable of artificial fibers such as cotton, hemp, flax, linen or rayon are drawn through the extrusion orifice of a rubber tubing machine while a tubular coating of natural or synthetic rubber or similar compound 31 is extruded in the same direction through the same orifice. The rubber compound emerges from the orifice in the head of the tubing machine in a plastic partially cured condition and in surrounding relation to the tensile strands 30. The extruded composite member comprising the tensile strands 30 and the surrounding envelope 31 of partially cured rubber material is then immediately wrapped spirally or in the form of a tight helyx about a cylindrical mandrel or rod with adjacent convolutions in side-by-side contacting relation, or substantially so. The ends of the wrapped member are secured to the supporting mandrel by tying or by the use of suitable clamps, and the mandrel, carrying the wrapped member, is then placed in a steam pressure heated autoclave or other heater and the curing of the rubber envelope 31 is completed conventionally.

After removal from the heater the cured leash member is cooled and then unwrapped from the mandrel or form. Since the curing of the member occurs while it is wrapped about the internal form or mandrel, the member takes on a permanent set in the form of a helical coil having uniform convolutions. Although the member is itself inextensible by reason of the tensile elements 30 incorporated therein, the leash 3 as a unit is resilient and extensible by reason of the resistance of the rubber envelope 31 to distortion out of its cured helical coil shape. This resistance of the leash element to elongation is derived from twisting strains imposed on the leash convolutions as distinguished from elongation or stretching such as would occur in the case of a conventional leash of elastic material. Thus, the device of the present invention can be used satisfactorily to restrain a child as young as 2 years of age and the leash can be easily fully extended without imposing excessively large forces on such child.

When the leash element 3 is fully extended under tension in normal use, it is substantially straight, as shown in FIG. 1 and it has a length at least about 4 times its unstressed length. Furthermore, upon release of the stretching or elongating strain the leash element is capable of returning by inherent resiliency to its helical coil form with tight or closely spaced convolutions and its original length and shape in which it was cured, or substantially so.

A supplemental connection between the leash element 3 and the child's band 2 at the child's end of the leash is provided by a relatively short flexible chain or similar tensile element 33. This element is connected as by spring locking snap hooks 34, 35 between the metal ring 21 of the child's band and the swivel ring 25 of the snap hook assembly on the child's end of the leash. Swivels 36 are interposed between the snap hooks 34, 35 and the corresponding ends of the chain 33 to prevent twisting and kinking of the chain.

The combination of the relatively short tensile element or chain 33 and the snap hooked relatively long leash element 3 has a number of advantages in use. When connected as shown in FIG. 2 the chain 33 provides a safety feature in that disconnection of the hook 23 by the child or through inadvertence does not completely release the child since the connection between the band 2 and the child's end of the tensile element 3 is maintained through the chain 33. Furthermore the chain 33, connected as illustrated, holds the child's band 2 in captive relation to the leash element 3 when the child's band is removed from the child, thus preventing loss of such band.

As another feature of the combination, the adult can effect a close coupled relation of the child for increased safety as in crossing a street. This is accomplished by disconnecting the snap hook 23 from the eye 22 of the buckle on the child's band 2 and connecting such hook to the metal ring 8 secured about the wrist of the adult. In this close coupled arrangement the two bands at 1, 2 are connected directly and in swivel relation by the short chain 33; the helical coil leash element 3 hangs suspended in a loop from the ring 8 of the adult's band. When so hanging the tight coil of the leash element 3 prevents the latter from dragging on the ground or becoming entangled about the limbs of the child or adult. As a safety feature, the bands 1, 2 remain connected in the transition period when the snap hook 23 is removed from the buckle 17 of the child's band and before it is received on the ring 8 of the adult's band; the possibility of the child dashing away from the adult while temporarily unhooked is thus eliminated.

The end loops in the wrist bands are suitably secured as by stitching or rivets, one such rivet being shown at 28 in the child's band 2.

Another specialized use for the combination which includes the supplemental chain 33 is in coupling the child directly to a fixed anchorage or other suitable object such as a marketing or baby carriage. To accomplish this the adult first disconnects the hook 23 from the eye 22 of the buckle tongue 18 of the child's band 2 and connects such hook directly to a ring on the carriage or other article or anchorage. Thereafter, the adult disconnects the hook 9 from the band 1 on the wrist of the adult and connects such hook directly to the same ring as that on which the hook 23 is received. Thus the child is close coupled to the carriage or other article, the helical coil leash element 3 hangs in a loop from the ring to which the child is coupled, and the adult, still wearing the band 1, has freedom of movement without the impediment of the child. In thus effecting a connection of the child directly to the carriage or other article, the child is at no time free to escape, being continuously connected by the leash element 3 to the band 1 about the wrist of the adult while the adult is releasing the hook 23 from the buckle 17 and reconnecting such hook to the carriage.

Thus the present invention provides a generally improved safety leash combination by means of which an adult is able safely and easily to control the movements of a small child. The device incorporates a helical coil leash element that while resiliently resisting elongation, is readily elongated to at least 4 times its unstressed length under the normal strains imposed by an infant. Yet the member comprising such helical leash element is itself substantially inextensible to provide a positive restraint at a predetermined distance. The device combines a relatively long helical coil leash element with a relatively short flexible and inextensible chain, or equivalent, the short chain being connected between the child's wrist band and the adjacent or child's end of the flexible elastic leash element. Such connection of the short chain to the child's wrist band is independent of the main snap hook by means of which the adjacent child's end of the flexible leash element is connected to the child's wrist band for facile removal and replacement. By this arrangement the child's band can be closely coupled to either the adult's band or to any suitable object, using the same snap hook 23 that normally connects the flexible leash element 3 to the child's band 2.

As further close coupling alternatives, either of the small snap hooks 34, 35 on the ends of the short chain 33 may be disconnected from the rings 21, 25, respectively, and reconnected to the ring 8 of the adult's band 1 or to a suitable fixed anchorage. If one of the hooks 34, 35 is connected to the ring 8, the helical coil leash 3 merely hangs in a non-tangling unused loop; if one of such hooks is connected to an anchorage, the snap hook 9 is disconnected from the adult's ring 8 and connected to one of the rings 21, 25 to free the adult.

The embodiment described is by way of illustration, it being apparent that various changes in structural details, particularly with respect to the construction of the bands and the connections of the extensible elements, may be resorted to without departing from the fundamentals of the invention. It is intended that the patent shall cover, by summarization in the appended claims, all features of patentable novelty residing in the invention.

What I claim and desire to secure by Letters Patent of the United States is:

1. A safety device for use by an adult in maintaining control over a child, said device comprising a first inextensible flexible band adapted to be placed about a child's wrist, a buckle on the band for adjusting its effective size and securing the band in place, said buckle including a locking element formed with an eye, a second inextensible band adapted to be received about an adult's wrist, a flexible and elastic leash element having one of its ends connected to the second band, a hook connected to the other end of the leash element and having a spring lock, said hook being removably received through the eye of the buckle to connect said other end of the leash element to the first band, the presence of the hook in said eye preventing independent unbuckling and removal of the first band from about a child's wrist, the leash element being stretchable in normal use to a working length at least four times its normal unstressed length and, upon being relieved of tensile strain, having the characteristic of returning by inherent resiliency to said unstressed length, a ring fast to the first band, a relatively short flexible inelastic chain secured at one of its ends to the other end of the leash element independently of the hook, means on the other end of said chain connecting the chain to said ring and thereby attaching said other end of the leash element to the first band independently of said hook, and means on the second band adapted to receive the hook upon its removal from the eye in effecting an inelastic connection between the bands.

2. A safety device for use by an adult in maintaining control over a child, said device comprising a first inextensible band adapted to be placed about a child's wrist, a buckle on the band for adjusting its effective size and securing the band in place, said buckle including a locking element formed with an eye, a second inextensible band adapted to be received about an adult's wrist, a ring fast to the second band, a flexible and elastic leash element, a first snap hook connected to one end of the leash element and snapped onto the ring for facile removal and replacement, a second snap hook connected to the other end of the leash and having a spring lock, said second hook being removably received through the eye of the buckle to connect said other end of the leash element to the first band, the presence of the second hook in said eye preventing independent unbuckling and removal of the first band from about a child's wrist, the leash element being stretchable in normal use to a working length at least four times its normal unstressed length and, upon being relieved of tensile strain, having the characteristic of returning by inherent resiliency to said unstressed length, another ring fast to the first band, a relatively short flexible inelastic chain secured at one of its ends to the other end of the leash element independently of the second hook, means on the other end of said chain for facile connection and disconnection of the chain to said other ring for attachment of said other end of the leash element to the first band independently of said second snap hook, means on the second band adapted to receive said last mentioned connecting means upon its disconnection from such other ring in effecting an inelastic connection between the bands, and swivel means in one of the leash connections.

3. A safety device for use by an adult in controlling a child, said device comprising a first band adapted to be placed about a child's wrist, a second band adapted to be placed about an adult's wrist, and a flexible leash element connected between the bands; the connection between the leash element and the first band comprising a first hook on the leash element and means on the first band providing an eye in which the hook is received for facile removal and replacement, a supplemental relatively short flexible element connected at one end to the leash element adjacent and independent of the hook and at the other end to the first band, said other end connection including a second hook on the supplemental element, and ring means on and carried by said second band adapted to receive one of the hooks upon disconnection of such hook from the first band in effecting a relatively short connection between the bands.

4. A safety device as claimed in claim 3 in which a ring is fast to the first band at a point spaced from the eye and is adapted to receive the first hook in connected relation upon removal of such first hook from the eye.

5. A safety device as claimed in claim 3 in which the first band comprises a strap formed with a plurality of spaced holes and a buckle having a tongue insertable selectively through one of the holes, said eye in which the first hook is received being formed in the tongue to prevent unbuckling of the strap.

6. A safety device for use by an adult in controlling a child, said device comprising a pair of bands adapted to be received respectively about a child's wrist and about an adult's wrist, one of the bands comprising a strap formed with a series of spaced holes and and a buckle fast to the strap and having a tongue insertable selectively through different ones of the holes, said tongue being formed with an eye providing an attachment ring, another attachment ring fast to the one band at a point spaced from the buckle, a flexible leash element connecting the bands, said leash element at one end being fast to one of the attachment rings, a supplemental relatively short flexible leash element, means connecting the ends of the short element to the attachment rings of the one band and including a hook adapted for facile disconnection and reconnection from and to the other of such rings, a ring fast to the other of the bands, and the hook being adapted, upon such disconnection, to be readily connected to the last mentioned ring in establishing the supplemental element as a short tie connecting the one ring of the one band to the ring of the other band.

7. A safety device for use by an adult in maintaining control over a child, said device comprising a first band adapted to be placed about a child, a buckle on the band for adjusting its effective size and securing the band in place, said buckle including a locking element formed with an eye, a second band adapted to be received about an adult, a flexible leash element having one of its ends connected to the second band, a locking hook on the other end of the leash element said hook being detachably received through the eye to connect said other end of the leash element to the first band for facile removal and replacement, the presence of the hook in said eye preventing independent unbuckling and removal of the first band from about a child, a supplemental connecting element relatively short in length compared to the length of the leash element, means independent of the hook connecting one end of such supplemental element to the leash element at a point adjacent the other end of the latter, means independent of the buckle connecting the other end of the supplemental element to the first band at a point of the latter spaced from the locking element, and one of said connecting means being adapted for facile detachment from and reattachment to its connection point, said supplemental element holding the leash element and said first band safe in connected relation upon disconnection of the snap hook from the eye of the buckle.

8. A safety device for use by an adult in maintaining control over a child, said device comprising first and second bands adapted to be placed about a child and an adult, respectively, one of the bands having an attachment ring secured thereto, a flexible relatively long elastic leash element having one end connected to the other of the bands, means comprising a buckle adapted to adjust the size of said one of the bands, said buckle including a locking element formed with an eye, a relatively short leash element, means connecting one end of such short element to the other end of the long element and connecting such one end of the short element and other end of the long element to the one band at a common point, means connecting the other end of the short element to the one band at a point spaced from the common point, one of said connecting means comprising a locking hook detachably received through said eye and one of said connecting means comprising the attachment ring secured to the one band, and said connection of the short element to the long element being independent of said locking hook.

9. A safety device for use by an adult in maintaining control over a child, said device comprising first and second bands adapted to be placed about a child and an adult, respectively, the bands each having an attachment ring secured thereto, means comprising a buckle adapted to adjust the size of one of the bands, said buckle including a locking element formed with an eye, a flexible relatively long elastic leash element having one end connected to the ring of the other of the bands, a relatively short inelastic leash element, means connecting one end of such short element to the other end of the long element and connecting such one end of the short element and other end of the long element to the one band at a common point, means connecting the other end of the short element to the one band at a point spaced from the common point, one of said connecting means comprising a locking hook detachably received through said eye and one of said connecting means comprising the attachment ring secured to the one band, and said connection of the short element to the long element being independent of said locking hook.

References Cited in the file of this patent

UNITED STATES PATENTS

| | | |
|---|---|---|
| 457,687 | Weimer | Aug. 11, 1891 |
| 810,336 | Higgins | Jan. 16, 1906 |
| 904,530 | Harlow | Nov. 24, 1908 |
| 2,171,553 | Hay | Sept. 5, 1939 |
| 2,173,096 | Campbell | Sept. 19, 1939 |
| 2,194,736 | De Bruler | Mar. 26, 1940 |
| 2,275,983 | Nadeau | Mar. 10, 1942 |
| 2,413,903 | Beehler | Jan. 7, 1947 |
| 2,650,590 | Moore et al. | Sept. 1, 1953 |
| 2,737,154 | Michonski | Mar. 6, 1956 |